Sept. 24, 1946.  R. E. CARLSON  2,408,196

SPRINKLER HEAD

Filed June 23, 1944

Inventor
Rudolph E. Carlson.

By Christian K. Nielsen.
Attorney

Patented Sept. 24, 1946

2,408,196

UNITED STATES PATENT OFFICE 2,408,196

SPRINKLER HEAD

Rudolph E. Carlson, Jacksonville, Fla.

Application June 23, 1944, Serial No. 541,796

2 Claims. (Cl. 299—67)

This invention relates to sprinkler heads especially designed for use with underground lawn sprinkling systems, and it consists in the constructions, arrangements and combinations herein described and claimed.

It is a particular object of the invention to provide a sprinkler constructed in such manner that there is little danger of injuries to persons or damage to the sprinkler head or a lawn mower when the latter is moved across a lawn equipped with my sprinkler devices.

It is a still further and important object of the invention to provide a sprinkler of the character indicated in which a rotor is employed, actuated by the out-flow of water, effecting a more uniform distribution of water.

It is also an object of the invention to provide a sprinkler head in which the rotor member is longitudinally movable to an unseated position with respect to the head proper during operation and movable under action of gravity to a seated position to a horizontal point below the level ordinarily traversed by the cutting reel of a lawn mower.

Additional objects, advantages and features of invention will be apparent from the following description considered in conjunction with the accompanying drawing, wherein Figure 1 is a fragmentary vertical sectional view of the sprinkler constructed in accordance with my invention.

Figure 1:
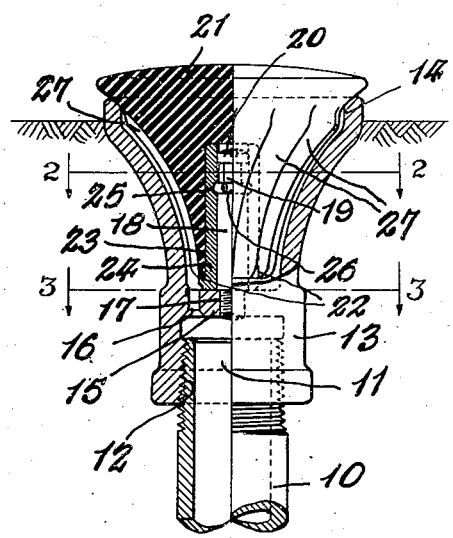

There is illustrated a conduit 10 which may be connected to an underground water line (not shown) in the usual manner. The terminal end 11 of the conduit is threaded as at 12, and receives a sprinkler head body 13, preferably substantially bell-shaped in side elevation, the open end 14 being presented upwardly, projecting but a short distance above ground level.

The body 13 has a transversely extending wall 15 integrally formed with the body and extending across the port of the conduit 10, and spaced circumferentially about the wall 15 a plurality of openings 16 are formed, located closely adjacent the inner wall of the body 13. Medially of the wall 15 there is formed a threaded bore 17 adapted to receive a threaded stud 18 extended vertically and axially of the head 15 but stopping short of the upper open end of the sprinkler body 13. Inwardly of the upper end of the stud 18 a longitudinal reduced portion 19 is formed, providing a shoulder 19' and a head 20.

Figure 5:
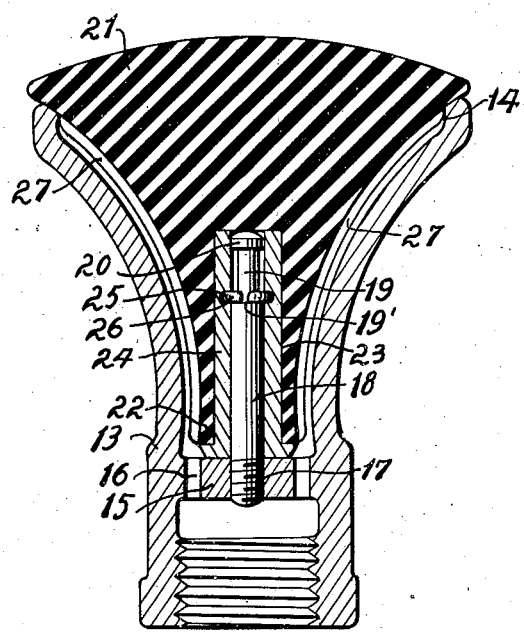
Figure 5 is an enlarged sectional view illustrating the mounting of the rotor.
Figure 2:
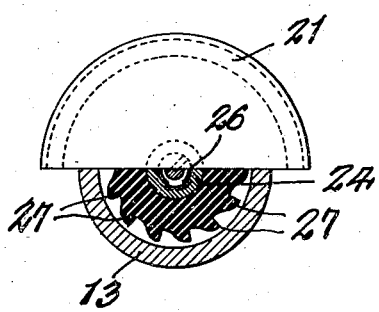
Figure 2 is a partial cross section on the line 2—2 of Figure 1.
Figure 4:
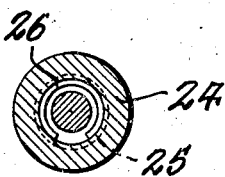
Figure 4 is an enlarged cross section illustrating the mounting of the sprinkler head.
Figure 3:
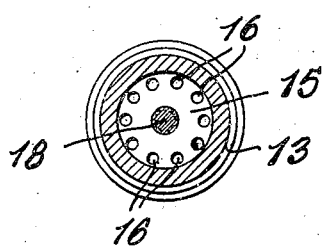
Figure 3 is a cross section on the line 3—3 of Figure 1.

A bell-shaped rotor or turbine 21 is employed, formed of rubber or other suitable material, the reduced portion 22 thereof having an axial bore 23 within which a flanged sleeve 24 is embedded, the sleeve being of a length terminating slightly above the head 20 of the stud. Upon the interior of the sleeve an annular groove 25 is formed, adapted to receive a split ring 26. The ring 26 normally rests upon the shoulder 19' of the stud 18, as shown in Figure 5, leaving ample clearance for vertical movement of the rotor 21 to afford passage of water between the rotor and the body 13. To assemble the rotor upon the stud, the split ring 26 being held compressed about the reduced portion, the stud and spring are presented into the sleeve 24 and moved longitudinally therein until the spring expands into the groove 25 of the rotor.

The rotor 21 is formed with a plurality of longitudinally extending vanes 27 upon the outer periphery thereof, the vanes being of a length extending from a point adjacent the reduced end of the rotor to a point slightly below the open end 14 of the body 13, when the rotor is in seated engagement. The vanes are directed in a common direction.

In use, water discharged from the conduit 10 will pass through the openings 16, the pressure of the water raising the rotor 21 along the stud 18 until the split ring 26 engages the head 20 of the stud. At the same time water will be forcibly impacted against the vanes 27 thereby effecting rapid rotation of the rotor, with uniform circumferential distribution of water around the sprinkler.

While I have shown and specifically described my invention, this is by way of illustration only, and I consider as my own all such modifications in construction as fairly fall within the scope of the appended claims.

I claim:

1. A sprinkler head for use with underground lawn sprinkling systems comprising a hollow substantially bell-shaped body member, having a threaded opening at the reduced end thereof, a transverse wall inwardly of said threaded opening, said wall having a plurality of openings in communication with said threaded opening, an axially disposed stud on said wall, said stud having a portion of reduced diameter and a head thereabove, a substantially bell-shaped turbine of dimensions to fit within the open end of said body member and having an outer circumference normally adapted to rest upon the open end of the hollow body member, said turbine having an axial sleeve slidably receiving said stud, said sleeve having an interior groove, a ring within the groove positioned to encircle said reduced portion of the stud, and said turbine having a plurality of vane members on the exterior surface disposed in the path of water discharged through the openings of the wall.

2. The structure of claim 1 in which the turbine is constructed of rubber.

RUDOLPH E. CARLSON.